Sept. 15, 1964    W. J. WARMERDAM    3,148,491
STALK REMOVER FOR COTTON GLEANER
Filed April 15, 1963

WILLIAM J. WARMERDAM
INVENTOR

Huebner & Worrel
ATTORNEYS

United States Patent Office 3,148,491
Patented Sept. 15, 1964

3,148,491
STALK REMOVER FOR COTTON GLEANER
William J. Warmerdam, 5510 16th Ave., Hanford, Calif.
Filed Apr. 15, 1963, Ser. No. 273,159
4 Claims. (Cl. 56—28)

This invention relates to apparatus adapted to remove elongated rigid particles of material from a continuous belt by which such material is being transported. The invention has particular utility in cotton gleaning, or scrapping, machines wherein the invention functions as a cotton stalk remover.

Contemporary gleaners adapted to recover cotton resting on the surface of a growing field have been fabricated in a variety of forms. A common characteristic of all forms of such gleaners is that some means is employed to engage, in a harvesting zone, discrete particles of cotton resting on the ground and to elevate such cotton particles to a discharge zone remote from the harvesting zone. Several of such cotton gleaners, which are known as cotton scrapping machines, utilize a plurality of individual continuous belts arranged in parallel, closely spaced, adjacent relationship. On the respective peripheral face of each of the individual belts, cotton engaging means is provided. In certain forms of cotton scrapping machines, the peripheral cotton engaging means is a plurality of projecting mechanical fingers adapted to snag, or hook, the particles of cotton and to transport them incident to movement of the individual belts. In other types of cotton scrapping machines, the cotton engaging means takes the form of uniformly circumferentially spaced transverse slits cut in the peripheral face of the individual belts, the slits being adapted to open to form V-shaped grooves prior to movement through the harvesting zone and subsequently close while in such zone, thereby to grasp particles of cotton in the grooves.

Regardless of the type of cotton engaging means provided in the individual cotton scrapping machine, a certain quantity of foreign material, such as cotton stalks, sticks, leaves, and other debris, generically referred to as "trash," is unavoidably recovered with the cotton salvaged by such machines. Although a certain portion of such trash recovered with salvaged cotton can be subsequently removed in cleaning operations incident to ginning of the cotton, an optimum cotton salvaging operation would recover a minimum quantity of such trash. Such an optimum operation is particularly desirable in view of the differential ginning rates charged by operators of cotton gins. The ginning rates are based upon a net percentage of lint turn-out, which is computed on a weight basis, i.e. gross weight of cotton plus seeds and trash delivered to the gin as compared to net weight of lint recovered during ginning. These ginning rates are generally inversely proportional to the turn-out percentage, in that the lower the lint turn-out, the higher per ton rate charged for the gross weight of cotton delivered to the gin. Such differential ginning rates, in effect, financially penalize owners of cotton which contains a high ratio of trash. Therefore, it is economically advantageous to remove as much trash as possible during the salvaging operation performed by cotton scrapping machines, particularly trash of substantial size and relatively high density. By removing such trash, the net efficiency of cotton scrapping machines is remarkably improved.

Accordingly, it is a primary object of the present invention to improve the operating efficiency of cotton scrapping machines.

Another object is to provide in a cotton scrapping machine a device which effectively removes rigid elongated particles of foreign material.

Another object is to provide in a machine adapted to engage and transport discrete particles of flexible material having intermixed therein other rigid particles, a means to remove such rigid particles during the transportation of the intermixed particles.

Another object is to provide in a cotton scrapping machine employing a plurality of closely adjacent parallel harvesting belts, a device in conjunction with such belts to remove rigid elongated particles of trash, such as cotton stalks and the like.

These, together with other objects, will become more fully apparent upon reference to the following description and accompanying drawing.

Figure 1:
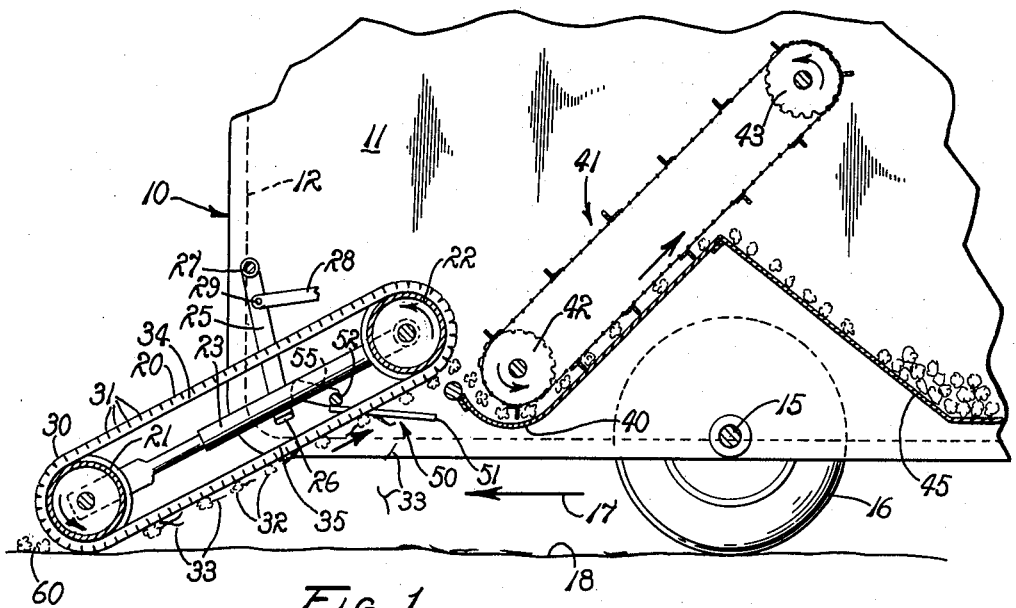
FIG. 1 is a fragmentary view in side elevation and partly in section showing a cotton scrapping machine provided with a stalk remover embodying the principles of the present invention.

Referring more particularly to FIG. 1, a cotton gleaner generally termed a cotton scrapping machine, is fragmentarily illustrated at 10 and includes a pair of laterally opposed side walls 11 secured to a rigid frame, a portion of which is shown at 12. A transversely extended axle 15 is rigidly supported in the frame 12. The cotton scrapping machine is adapted for ground traversing movement by a pair of laterally opposed wheels 16 mounted on the axle. In certain commercial forms of such machines, such ground traversing movement is normally effected by means of a draft vehicle, such as an agricultural tractor, not shown. As illustrated in FIG. 1, the cotton scrapping machine 10 is adapted for movement from right to left, as indicated by the arrow 17, to glean cotton particles resting on the surface of the earth 18.

The cotton scrapping machine 10 includes a plurality of individual endless cotton harvesting belts 20 mounted in closely spaced, parallel relationship. Each of the belts is trained about a respective pair of spaced pulleys 21 and 22 mounted for rotation about individual axes on a support bar 23. Preferably, the support bar is arranged for selective longitudinal extension and retraction whereby the tension on each individual belt is accurately adjusted.

An elevation control arm 25 is provided with a finger 26 adapted to engage the support bar 23 upon rocking movement of the control arm about a fixed shaft 27. An actuating lever, fragmentarily illustrated at 28, and pivotally connected at 29 to the control arm 25, is under the influence of the operator of the cotton scrapping machine to effect selective elevation of the forward end of the cotton harvesting belt. Typical of such cotton harvesting belts is that illustrated in United States Patent No. 2,670,584 issued to W. E. Rood, Jr. et al. on March 2, 1954. As shown in that patent, the harvesting belt is supported in the machine for pivotal movement about the axis of rotation of the pulley 22 and is gravitationally biased into contact with the surface of the earth 18. Accordingly, the belt is moved in a path of movement, having a counterclockwise direction as viewed in FIG. 1, incident to ground traversing movement of the machine in the direction of the arrow 17.

The belt 20 affords a peripheral surface 30 provided with a plurality of uniform, transversely extended, circumferentially spaced slits 31. As described in detail in the aforesaid patent, the slits are radially inwardly extended a sufficient distance to permit each of the slits sequentially to open upon movement of the continuous belt about the circuitous path defined by the pulleys 21 and 22 and form V-shaped grooves upon such opening.

The slits open at the initial flexing about either of the pulleys 21 or 22 and close incident to resuming travel in a rectilinear portion of the path of movement of the belt. Accordingly, the slits open at one end of the path defined by the pulleys 21 and 22, sequentially close during a rectilinear portion to grasp objects in close proximity to the belt, and open at the opposite longitudinal limit of the path, thereby to discharge objects previously grasped in the slit and transported by the belt.

In the particular environment illustrated, each of the individual slits 31 is adapted sequentially to grasp, transport and discharge discrete particles of cotton 32 resting upon the surface of the earth 18. As in the case of nearly all cotton gleaned from the surface of a growing field, foreign particles 33 of a semi-rigid nature and normally consisting of cotton stalks, sticks, leaves and other debris generically classed as trash are unavoidably harvested with the cotton. The slits 31 are unable to differentiate between the trash 33 and the cotton 32 and normally recover all loose particles lying in the path of travel of the machine, regardless of the desirability of such particles.

It will be observed that the path of travel of each of the belts 20 incldues an upper run 34 during which the slits 31 are free from particles, and a lower run 35, which corresponds with the rectilinear path of travel of the belt during which particles of both the cotton and the foreign material are transported by reason of their being grasped by the belt and held in the slits 31. As can be seen in FIG. 1, particles of cotton 32 and foreign material 33 are transported upwardly by the lower run of the belt and are gravitationally depending therefrom during such transport.

A receiving tray 40 is disposed adjacent to the rearward ends of the belts 20 and is adapted to collect particles of cotton discharged therefrom, as well as any trash included therein. A transfer conveyor 41 is mounted in the cotton scrapping machine for rotation in a counterclockwise direction, as viewed in FIG. 1, and trained about a pair of longitudinally spaced pulleys 42 and 43. One of such pulleys is powered for rotation by means, not shown, to transfer the cotton from the tray 40 and to deposit such cotton in a receiving hopper 45.

A stalk remover embodying the principles of the present invention is generally indicated at 50 in FIG. 1. As can be seen more clearly in FIG. 2, the stalk remover includes a plurality of individual, elongated, rigid rods 51 disposed intermediate adjacent belts at respective positions transversely adjacent to and longitudinally coincident with the respective cotton transporting portion of each of the belts. The individual rods 51 are rigidly secured, as by welding, to a transverse mounting bar 52. The mounting bar is supported in the side walls 11 of the machine for rocking movement about its longitudinal axis by a pair of cap screws 53 screw-threadedly received in tapped holes provided in each end of the bar 52. An adjusting arm 55 is rigidly radially extended from the mounting bar to effect rocking motion about its longitudinal axis and consequently adjust the angular relationship of the rods to the lower run 35, which, in the cotton scrapping machine illustrated, is the transporting portion of the harvesting belts 20. A retaining bolt 56 is extended through a suitable aperture provided in the distal end of the arm 55 and received in an arcuate slot 57 provided in one of the side walls 11. Accordingly, the divergent angular relationship between the rods 51 and the cotton transporting portion of the belts downstream from such rods can be adjusted at an optimum position. In a commercial form of the invention, a satisfactory angular relationship has been found to be approximately 25°.

*Operation*

The operation of the described embodiment of the subject invention is believed to be readily apparent and is briefly summarized at this point. During gleaning of a cotton field wherein particles of cotton are to be salvaged from the surface of the field, the cotton scrapping machine 10 is propelled over the surface of the earth in a direction indicated by the arrow 17. Due to the fact that the harvesting belts 20 are gravitationally biased into engagement with the earth, movement of the belts is effected in a counterclockwise direction, as viewed in FIG. 1. Accordingly, the transverse slits 31 in each of the belts are sequentially moved from an open position in a harvesting zone, indicated at 60, and subsequently closed upon movement into the transporting portion constituting the lower run 35.

Figures 2, 3:
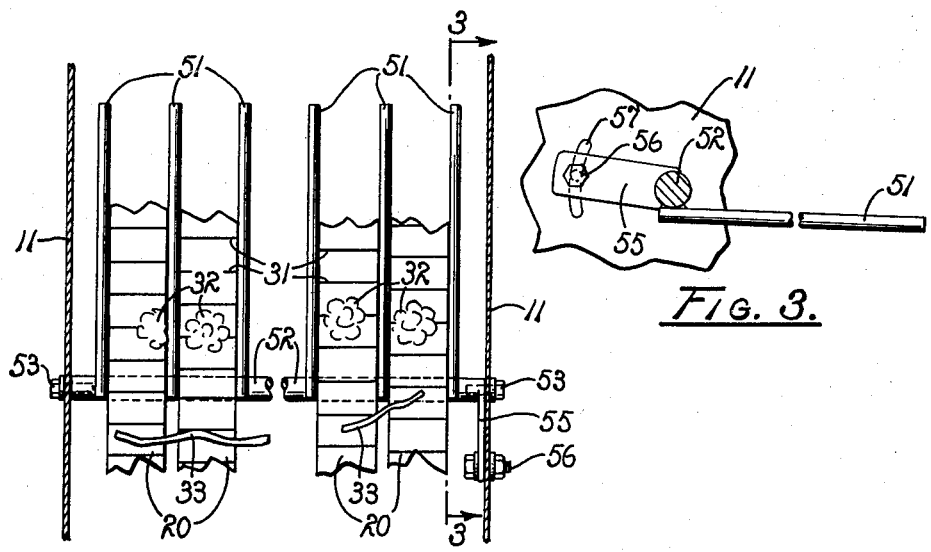
FIG. 2 is an enlarged fragmentary bottom plan view partly in section showing the stalk remover of the machine of FIG. 1.
FIG. 3 is a view in longitudinal vertical section taken on line 3—3 of FIG. 2.

During movement through the transporting portion of the path of movement of the belts 20, the individual cotton particles 32 and cotton stalks 33, as well as other rigid particles of trash, gravitationally depend from the belt as they are moved toward the discharge zone. During such movement, the rods 51 of the stalk remover 50 contact all particles transversely extended from each individual belt. Due to the flexibility of the fibers of each discrete particle of cotton 32, the rods 51 are ineffective to urge the cotton particles outwardly from the individual slit 31 in which the particle is then grasped. However, due to the semi-rigid nature of cotton stalks 33 and other foreign particles normally encountered in a cotton growing field, the rods 51 are quite effective in urging such stalks and trash outwardly from the individual slit 31 in which each particle of trash is being transported. In the event that the stalk is of an extensive length and breaches the transverse interval of spacing between adjacent belts, as illustrated in FIG. 2, more than one rod will engage such stalk and urge the stalk outwardly from the transporting portion of the belt.

By referring to FIG. 1, it can be seen that the rods 51 are angularly divergently related to the cotton transporting portion of the belt downstream from the rods. Such divergent angular relationship may readily be adjusted by means of the adjustment arm 55 and the remaining bolt 56 which is moved throughout a range of adjustment afforded by the slot 57. Such angular adjustment may be required to accommodate the particular rigidity and brittleness of stalks, depending upon moisture conditions existent at the time of cotton gleaning operations. In addition, the angular relationship may necessarily need to be adjusted to suit the particular ground traversing speed of the cotton scrapping machine 10.

As an illustration of the effectiveness of the stalk remover of the present invention, a two-row cotton scrapping machine was provided with a stalk remover embodying the principles of the invention dsecribed herein. However, a stalk remover was provided for the harvesting belts to be employed on only one of two rows normally harvested. The cotton recovered from each of the two rows was at all times segregated and later analyzed as to lint turn-out and trash content. Listed below are the results obtained by traversing a cotton growing field with such a cotton scrapping machine provided with a stalk remover on only one set, identified as "A," of the harvesting belts for said one row, while the belts for the other row were not so provided, and identified as "B":

| | "A" With Stalk Remover | "B" Without Stalk Remover |
|---|---|---|
| 1. Total cotton and trash recovered from field_ | 109.0 | 120.5 |
| 2. Pounds of trash removed from #1_____ | 16.5 | 26.5 |
| 3. Gross pounds of cotton (plus seed) recovered from field_____ | 92.5 | 94.0 |
| 4. Pounds of lint_____ | 22.29 | 22.56 |
| 5. Percent turn-out (#4÷#1)_____ | 20.37 | 18.72 |
| 6. Comparative percent turn-out_____ | +1.65 | |
| 7. Increase in efficiency (#6A÷5B), percent____ | 8.8 | |

By referring to the above statistics showing the difference in results in cotton recovered by a scrapping machine employing a stalk remover of the present invention to cotton recovered without such a stalk remover, it can be seen that 38% less trash is included in the cotton recovered by using a stalk remover in the scrapping machine. Such a significant reduction in total trash recovered results in an increase in net lint turn-out of 1.65%. However, this comparison of percentage turn-outs indicates that the cotton scrapping machine provided with a stalk remover has an increase in overall efficiency of 8.8%, when compared to the turn-out of a machine not so provided. This is of great economical importance when it is considered that ginning rates are based upon net turn-out of lint, and that the lower the percentage of turn-out, the higher the rate charged per ton of gross material ginned.

Accordingly, the present invention has proved to be of significant economic worth, and has great utility in removing semi-rigid particles of trash from all forms of transporting mechanisms. It is particularly adaptable to transport mechanisms employed in cotton scrapping machines, where such rigid materials are of a relatively high density and are especially undesirable in the cotton recovered. The adjustability of the stalk remover adapts it to accommodate a wide variety of operational environments so that at all times it is effective to increase the efficiency of cotton scrapping machines.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a cotton scrapping machine having a plurality of individually substantially identical continuous harvesting belts each affording peripheral means adapted to engage discrete particles of cotton resting on a surface of support and to transport said particles to a discharge area remote from said support surface, the cotton particles having a plurality of elongated particles of foreign material randomly intermixed therewith and being of a semi-rigid nature; means to support the belts in parallel closely spaced relationship for movement in respective, closed circuitous paths having a common downstream direction, each of said paths having a substantially rectilinear cotton transporting portion; a plurality of rigid elongated rods individually disposed between adjacent belts at a position transversely adjacent thereto and longitudinally coincident with the respective cotton transporting portions of said belts; and means mounting the rods in the machine obliquely angularly related to said path and divergently oriented with respect to said downstream direction of movement of the belt therealong, so that foreign particles carried by the individual belts and encountered by the rods are effectively disengaged from the peripheral engaging means of the individual belts.

2. The cotton scrapping machine of claim 1 wherein said rod mounting means includes selectively adjustable means permitting changes in the angular relation between the rods and the belts along the respective paths thereof.

3. In a cotton scrapping machine having a plurality of individual, substantially identical, continuous harvesting belts, each affording a peripheral face provided with a plurality of uniformly circumferentially spaced slits transversely extended across said face and being adapted to engage and grasp discrete particles of cotton resting on a surface of support and to transport said particles to a discharge area remote from said support surface, the cotton particles having a plurality of elongated particles of foreign material of a semi-rigid nature randomly intermixed therewith, the transverse slits also being adapted to engage said foreign particles and to transport them to said discharge area; means to support the belts in parallel, closely spaced relationship for movement in respective, closed circuitous paths in a common downstream direction with respective upper and lower runs afforded for each of the belts, each of said paths having a substantially rectilinear cotton transporting portion substantially coextensive with said lower run and arranged for movement in a downwardly facing position with both the cotton and the foreign particles depending from said lower run when engaged by said transverse slits; a plurality of rigid elongated rods individually disposed between adjacent belts at a position transversely adjacent to and longitudinally coincident with the respective cotton transporting portion of said belt; a mounting bar; means mounting the individual rods along said mounting bar at positions to dispose the individual rods between adjacent belts; a radially extended elongated adjustment arm rigidly extended from one end of said bar; means supporting the mounting bar in the machine for rocking movement of the bar about its longitudinal axis; and means adjustably securing said adjustment arm to the machine to permit selective changes in the angular relationship of the rods to said lower run so that rigid foreign particles being transported by the belt encounter said rod during movement through said transporting portion of the path and are urged downwardly away from said paths to be discharged from the individual gripping slits and to be gravitationally discharged from the belt.

4. The cotton scrapping machine of claim 3 wherein said rods are mounted at an annular relationship of approximately 25° in relation to the cotton transporting portion measured between the rod and the downstream portion of said path.

References Cited in the file of this patent
UNITED STATES PATENTS

| | | |
|---|---|---|
| 2,136,126 | Dove | Nov. 8, 1938 |
| 2,670,584 | Root et al. | Mar. 2, 1954 |
| 2,674,076 | Bryant | Apr. 6, 1954 |
| 2,928,224 | Powell | Mar. 15, 1960 |
| 3,039,257 | Brewster | June 19, 1962 |